United States Patent
Chang et al.

(10) Patent No.: US 7,817,617 B2
(45) Date of Patent: Oct. 19, 2010

(54) REQUEST ROUTING MECHANISM FOR DISTRIBUTED MULTI-PARTICIPANT SERVICE APPLICATION SERVERS IN AN INTERNET PROTOCOL MULTIMEDIA SUBSYSTEM NETWORK

(75) Inventors: Wen-Yang Chang, Plano, TX (US); Nhut Nguyen, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 829 days.

(21) Appl. No.: 11/391,749

(22) Filed: Mar. 29, 2006

(65) Prior Publication Data

US 2007/0263822 A1 Nov. 15, 2007

(51) Int. Cl.
*H04L 12/28* (2006.01)
(52) U.S. Cl. ............... 370/351; 370/260; 370/312; 379/202.01; 379/221.06
(58) Field of Classification Search ............ 379/202.01, 379/158, 221.06; 370/260, 351, 312
See application file for complete search history.

(56) References Cited

U.S. PATENT DOCUMENTS

| | | | | |
|---|---|---|---|---|
| 5,613,069 A | * | 3/1997 | Walker | 709/238 |
| 5,862,211 A | * | 1/1999 | Roush | 379/309 |
| 6,438,111 B1 | * | 8/2002 | Catanzaro et al. | 370/260 |
| 6,978,002 B1 | * | 12/2005 | Cope et al. | 379/202.01 |
| 2005/0036443 A1 | * | 2/2005 | Collins | 370/216 |
| 2005/0276268 A1 | * | 12/2005 | Poikselka et al. | 370/395.2 |
| 2006/0270404 A1 | * | 11/2006 | Tuohino et al. | 455/432.3 |
| 2007/0008951 A1 | * | 1/2007 | Naqvi et al. | 370/352 |

* cited by examiner

*Primary Examiner*—Fan Tsang
*Assistant Examiner*—Simon King

(57) ABSTRACT

A multi-participant service creator Application Server embeds routing information within a service identifier provided to enable invitation of users to a multi-participant service such as conference calling or push-to-talk communication. A multi-participant service routing function associated with the Serving Call Session Control Function receiving a request to join the multi-participant service checks the embedded routing information and ensures that the join request is routed to the service creator Application Server.

22 Claims, 3 Drawing Sheets

REQUEST ROUTING MECHANISM FOR DISTRIBUTED MULTI-PARTICIPANT SERVICE APPLICATION SERVERS IN AN INTERNET PROTOCOL MULTIMEDIA SUBSYSTEM NETWORK

TECHNICAL FIELD

The present disclosure is directed, in general, to telecommunications systems and, more specifically, to a method of request routing to a multi-participant service creator Application Server in an Internet Protocol Multimedia Subsystem network.

BACKGROUND

A centralized Application Server (AS), when employed for a multi-participant service such as conference calling within a telecommunications system as illustrated in FIG. 4A, is generally not scalable and can be a bottleneck in system operation. Each Serving Call Session Control Function (S-CSCF) knows the address of the centralized AS and can send service requests directly to the AS. A centralized AS may reside in any Call Application Node (CAN) with an S-CSCF as shown in FIG. 4A, or in a dedicated node without an S-CSCF (not shown).

In a distributed Application Server architecture, an Application Server is co-located with an S-CSCF in every call application node and receives service requests from its local S-CSCF. Co-location of a plurality of multi-participant service application servers at each of a plurality of call application nodes as illustrated in FIG. 4B is scalable, but does not ensure that the service creator for a multi-participant service such as conference calling will receive requests relating to that service (e.g., requests to join the conference call) from other service users or participants since each S-CSCF only sends service requests to its local application server.

There is, therefore, a need in the art for an effective request routing mechanism for distributed multi-participant service application servers to ensure that participant service requests are properly routed.

SUMMARY

A multi-participant service creator Application Server embeds routing information within a service identifier provided to enable invitation of users to a multi-participant service such as conference calling or push-to-talk communication. A multi-participant service routing function associated with the Serving Call Session Control Function receiving a request relating to the multi-participant service checks the embedded routing information and ensures that the multi-participant service request is routed to the service creator Application Server.

Accordingly, in one embodiment of the disclosure, there is provided a communications system comprising a plurality of call application nodes each including a multi-participant service application server, each multi-participant service application server capable of establishing a multi-participant service upon request, wherein any request relating to a multi-participant service may be routed to any of the nodes. The communications system also comprises a multi-participant service routing function associated with the respective serving call session control function. The multi-participant service routing function determines routing information, if any, embedded in a service identifier from a multi-participant service request routed to the node. The multi-participant service routing function also processes the multi-participant service request based upon either the routing information or the absence of routing information from the service identifier.

In another embodiment of the disclosure, there is provided a method of processing multi-participant service requests within a communications system. The method comprises the step of routing requests relating to a multi-participant service to any of a plurality of call application nodes each including a multi-participant service application server, each multi-participant service application server capable of establishing a multi-participant service upon request. The method also comprises the step of employing a multi-participant service routing function associated with the respective serving call session control function at a call application node receiving a multi-participant service request to at least one of: a) determine routing information, if any, embedded in a service identifier from the multi-participant service request, and b) process the multi-participant service request based upon either the routing information or the absence of routing information from the service identifier.

In still another embodiment, a communications network is provided comprising a plurality of call application nodes. Each call application node includes: i) a serving call session control function receiving requests relating to one or more multi-participant services, ii) a multi-participant service application server capable of establishing a multi-participant service upon request and of admitting participants into a multi-participant service upon request, and iii) a multi-participant service routing function receiving multi-participant service request from the serving call session control function within the respective call application node, determining routing information, if any, embedded in a service identifier for a multi-participant service request routed to the respective call application node, and processing the multi-participant service request based upon either the routing information or the absence of routing information from the service identifier.

The foregoing has outlined rather broadly the features and technical advantages of the subject matter disclosed so that those skilled in the art may better understand the detailed description that follows. Additional features and advantages will be described hereinafter that form the subject of the claims. Those skilled in the art will appreciate that they may readily use the conception and the specific embodiment(s) disclosed as a basis for modifying or designing other structures for carrying out the same purposes identified herein, as well as other purposes. Those skilled in the art will also realize that such equivalent constructions do not depart from the spirit and scope of the disclosed subject matter in its broadest form.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
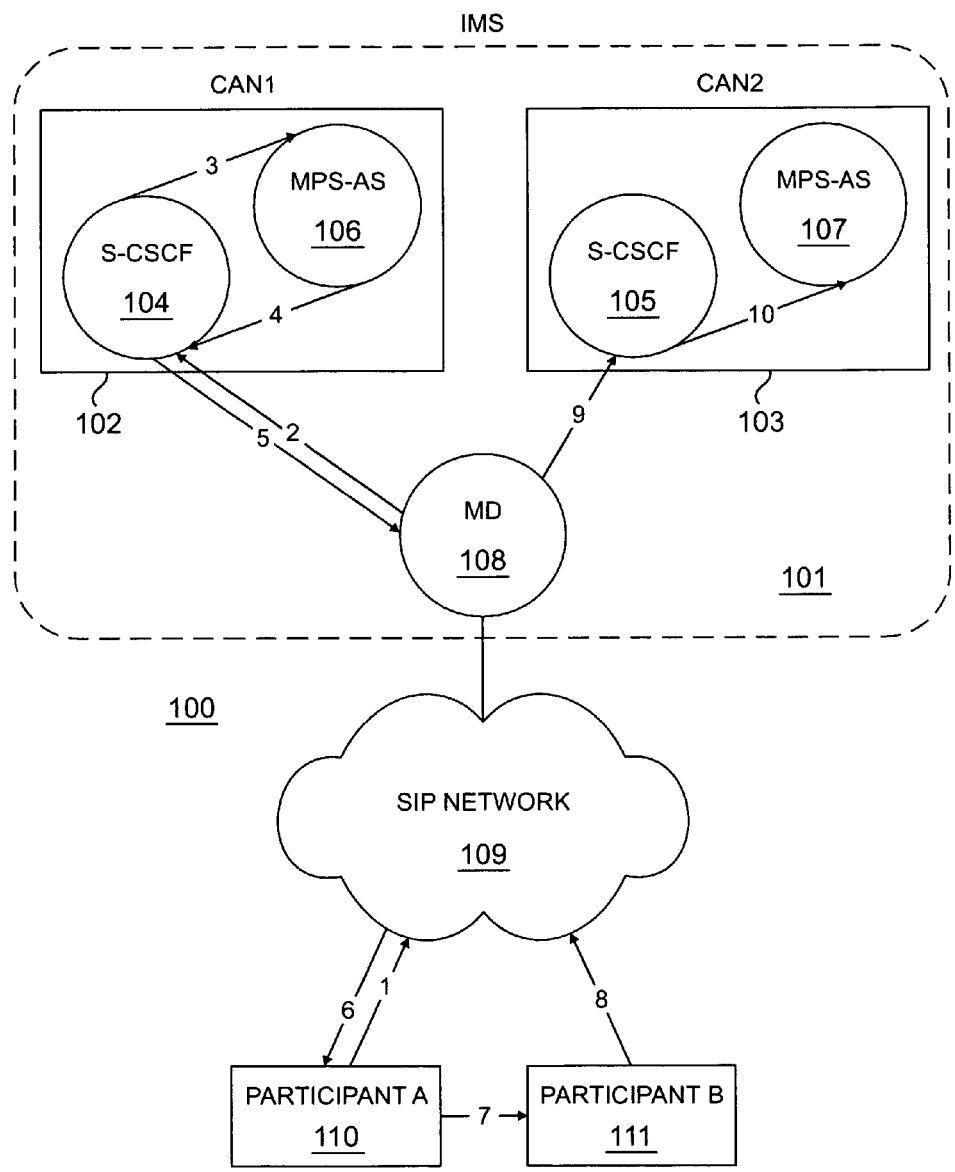
FIGS. 1 and 2 are comparative high-level block diagrams of a telecommunications system without and with, respectively, a request routing mechanism for distributed multi-participant service application servers according to different embodiments including one embodiment of the present disclosure.
Figure 2:
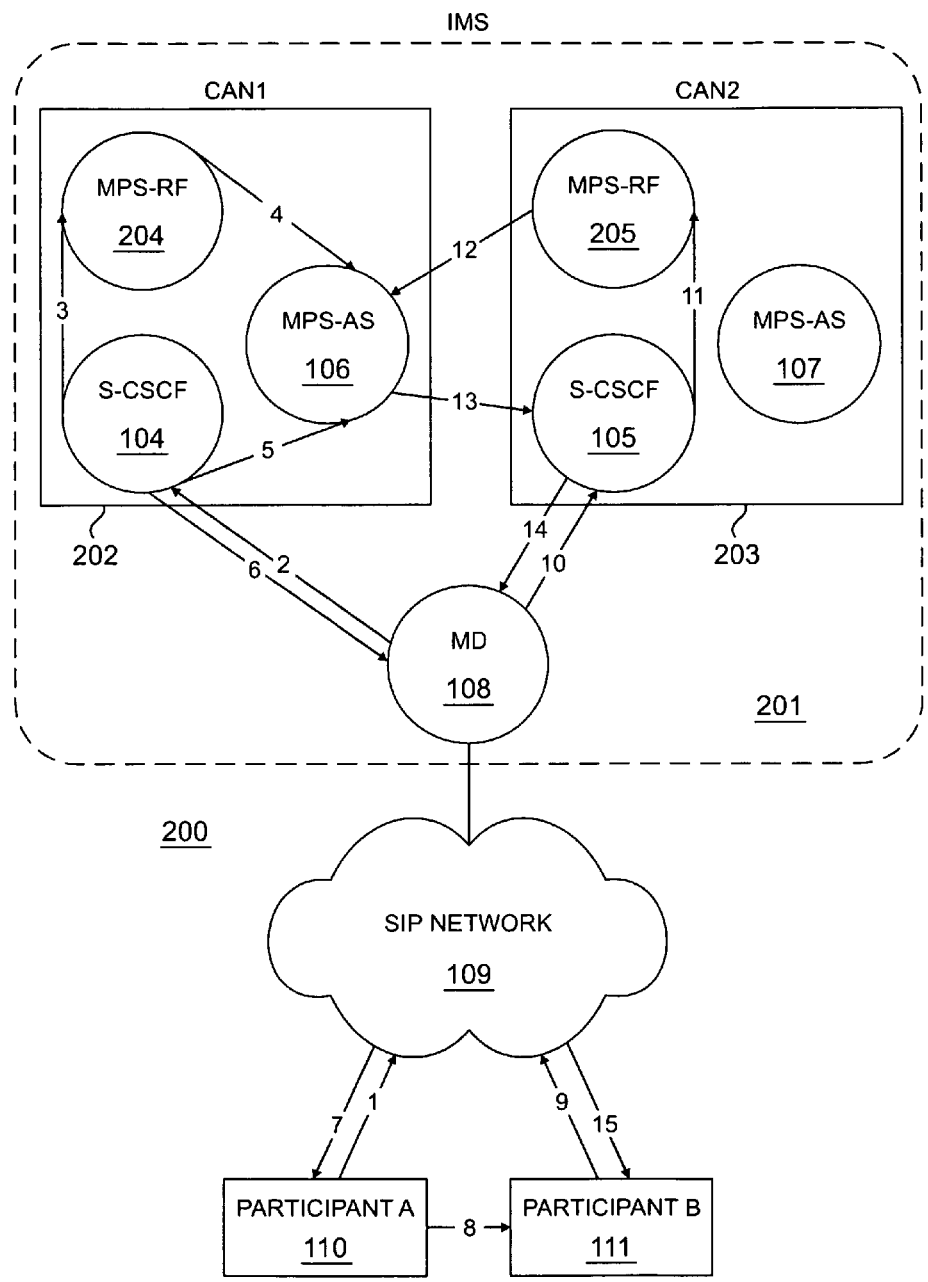
Figure 3:
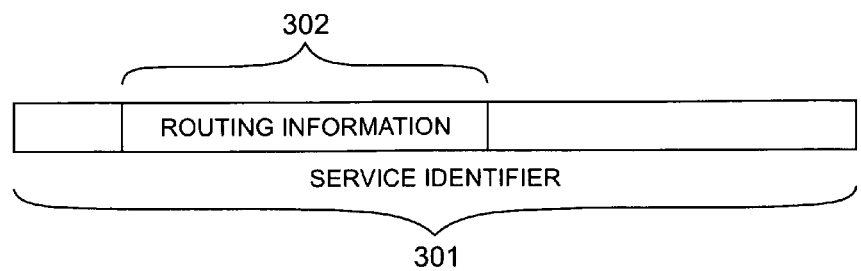
FIG. 3 is a diagram of a service identifier employed by a telecommunications system with a request routing mechanism for distributed multi-participant service application servers according to one embodiment of the present disclosure.
Figure 4A:
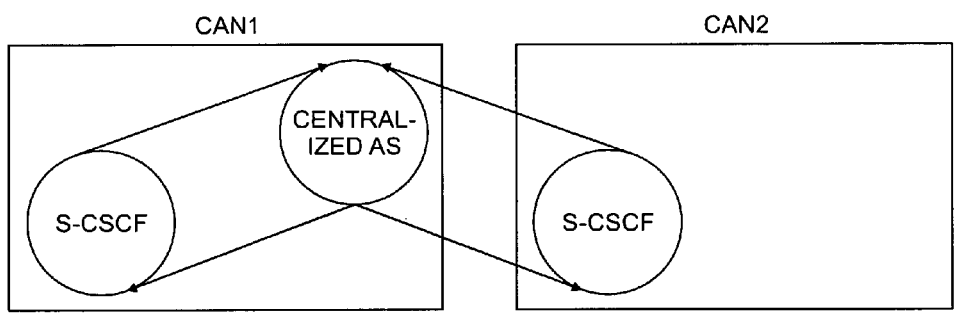
FIGS. 4A and 4B comparatively illustrate centralized and distributed application servers, respectively.
Figure 4B:
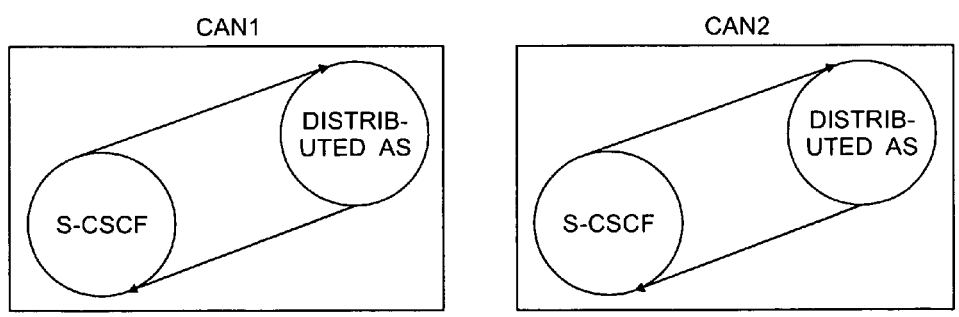

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

FIG. 1 is a high-level block diagram of a telecommunications system without a request routing mechanism for distributed multi-participant service application servers according to one possible embodiment. An Internet Protocol (IP) Multimedia Subsystem (IMS) 101 within the telecommunications network 100 includes two Call Application Nodes (CANs) 102 and 103, each including a respective Serving Call Session Control Function (S-CSCF) 104 and 105 and a respective multi-participant service Application Server (MPS-AS) 106 and 107. A Message Distributor (MD) 108 interfaces with a Session Initiation Protocol (SIP) network 109, through which participants A 110 and B 111 request services from Application Servers 106, 107.

The Call Session Control Function (CSCF) functionality provides the SIP session control within the IMS network 101, with each Serving Call Session Control Function (S-CSCF) 104, 105 located in the user's home network being the entity that invokes service logic. (The user's "home" network may be, for example, a network serving a particular metropolitan or other geographic region within which the user normally resides). The Application Servers run the invoked service logic and provide services to the end users. The multi-participant service Application Servers 106, 107 depicted in FIG. 1 provide multi-participant services such as conference calling or push-to-talk communication to the end users. The MD 108 is an entity that distributes initial service request messages from end users across the S-CSCFs 104, 105 based on a load-sharing policy. The initial selection policy may be round-robin (i.e., distribution of new messages in sequential order to each S-CSCF 104, 105) or some other algorithmic policy.

The Application Servers 106, 107 are employed within the IMS network 101 to provide services to end users. Some services, such as conference calling or push-to-talk communication, involve a group of participants joining together asynchronously for collaboration. These services, when invoked, require the Application Server that creates the service to receive and process for proper handling all requests from any participant to that service. These requests include, but are not limited to, a request to initiate a service, a request from other users to join in the service, a request to add participants to the service, and a request to be notified of event information related to the service. In one embodiment, creating the service comprises instantiating a service instance or service object instance on a particular Application Server. In another embodiment, creating the service may comprise spawning or otherwise starting a process or task that provides the service functionality, the process or task executing on a particular Application Server. In this patent application the term "service" may be employed to refer to a general functionality, for example multimedia conferencing, or it may be employed to refer to a created service or service object instance, as for example a created multimedia conference service created on a specific Application Server and involving multimedia conference participants A, B, C, etc. The intended sense of "service" will be clear from the context where it is employed.

FIG. 1 includes numbers on the arrows to indicate the sequence of the message flow between components for the exemplary embodiment. In another embodiment, the sequence of messages may be different. A participant or user A 110 initiates a multi-participant service (for example, a conference call in the exemplary embodiment) by a request message 1 to MD 108 through SIP network 109. The MD 108 uses a round-robin algorithm or other suitable algorithmic policy to distribute that request (among others) to an S-CSCF. In the example shown, the request from user A 110 is directed as message 2 to S-CSCF 104 within CAN1 102. S-CSCF 104 forwards the request as message 3 to the local multi-participant service AS 106.

Multi-participant service AS 106 creates a multi-participant telecommunications service, for example, a conference call in the exemplary embodiment, and allocates a conference identifier (ID) for association with the newly created exemplary conference call. A response message 4 containing the conference ID is returned to S-CSCF 104 from multi-participant service AS 106, which then forwards that response as message 5 to MD 108. MD 108 sends the response as message 6 to user A 110 through SIP network 109. User A 110 then invites user or participant B 111 to join the conference call and provides user B 111 with the conference ID in message 7. User B 111 attempts to join the conference call using the conference ID received from user A 110 by request message 8 through SIP network 109 to MD 108.

Using the round-robin algorithm or other suitable policy, MD 108 distributes the request from user B 111 as message 9 to S-CSCF 105 in CAN2 103, which forwards the request as message 10 to the local multi-participant service AS 107. Since multi-participant service AS 107 is not the application server that created the conference call initiated by user A, multi-participant service AS 107 does not know how to process the request in message 10, because the created service, created service object instance, created service process, or created service task is not located on AS 107. As a consequence, user B 111 is unable to join the conference call.

FIG. 2 is a high-level block diagram of a telecommunications system including and employing a request routing mechanism for distributed multi-participant service application servers according to one embodiment of the present disclosure. Like components in FIGS. 1 and 2 are identified by like numbers, and components in FIG. 2 similar to a component in FIG. 1 but including additional functionality are designated by a "2xx" reference number rather than a "1xx" reference number (where "xx" are simply placeholders).

In the embodiment of FIG. 2, CAN1 202 and CAN2 203 within the IMS network 201 each include a multi-participant service routing function (MPS-RF) 204 and 205, respectively. The multi-participant service routing function is introduced to overcome the deficiency described above. Each multi-participant service routing function 204, 205 is co-located with an S-CSCF 104, 105, and serves to direct initial service requests from an end user (e.g., participant A 110 or participant B 111) to the appropriate service creator by looking up embedded routing information inside the service request message.

In the embodiment of FIG. 2, when the Application Server for a particular multi-participant service receives the initial service request message, that Application Server embeds routing information within a service identifier in the response message so that the Application Server is known to others as the service creator. The user initiating the service passes the service identifier to other participants to invite them to join the service.

As with FIG. 1, the arrows in FIG. 2 are labeled with numbers to illustrate the message flow for the exemplary embodiment, although other flow sequences are possible for other embodiments. User A 110 initiates the exemplary conference call by a request message 1 to MD 108 through SIP network 109, which employs the round-robin algorithm or other suitable policy to distribute the request as message 2 to S-CSCF 104 within CAN1 202. S-CSCF 104 forwards the request as message 3 to the local multi-participant service routing function 204. For a request to create a service (as opposed to a request to join the service), there is no routing information in the initial message. Therefore, multi-participant service routing function 204 forwards the request as message 4 to the local multi-participant service AS 106, which creates the exemplary conference call and allocates and associates a conference ID with the newly created conference call. The routing information for the service creator, AS 106, is embedded within the conference ID.

The conference ID with embedded routing information is returned to user A 110 by response messages 5, 6 and 7 through S-CSCF 104, MD 108 and SIP network 109. User A 110 invites user B 111 to join the conference call and provides user B 111 with the conference ID and embedded routing information in message 8. User B 111 attempts to join the conference call using the conference ID and embedded routing information by request message 9 through SIP network 109 to MD 108.

As described above, the load distribution policies employed by MD 108 may result in the request from user B 111 being sent to S-CSCF 105 in CAN2 203 as message 10. In the embodiment of FIG. 2, however, S-CSCF 105 forwards the request from user B 111 as message 11 to the local multi-participant service routing function 205. Multi-participant service routing function 205 extracts the routing information from the received conference ID and, if the extracted routing information does not match the routing information for the local multi-participant service AS 107, looks up the routing information in a table therein (not shown). Upon determining that the routing information relates to the service creator AS 106, multi-participant service routing function 205 forwards the request as message 12 to the multi-participant service AS 106 in CAN1 202. Service creator AS 106 processes the join request and sends back a response message 13 to S-CSCF 105, which forwards the response as message 14 to MD 108. The response is then forwarded by MD 108 through SIP network 109 to user B 111 in message 15 so that user B 111 may successfully join the conference call.

FIG. 3 is a diagram of a service identifier employed by a telecommunications system with a request routing mechanism for distributed multi-participant service application servers according to one embodiment of the present disclosure. The service identifier 301, which may be the conference ID described above or a service identifier for another type of multi-participant service, includes routing information 302 embedded therein. In an embodiment, routing information 302 may include an identifier to uniquely identify a service instance or service object instance on a particular multi-participant service application server within the IMS network. In another embodiment, a different type of routing information 302 may be employed.

Use of a multi-participant service routing function in conjunction with the S-CSCFs of an Internet Protocol Multimedia Subsystem, between each S-CSCF and a corresponding local multi-participant service AS to check routing of service requests, ensures that service requests reach the service creator AS even if load-sharing message distribution policies direct the service request to an S-CSCF other than the one associated with the service creator AS. It should be noted that the multi-participant service routing function may be a stand-alone entity, a part of the S-CSCF, or a part of the multi-participant service AS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communications system within an Internet Protocol multimedia subsystem, the communications system comprising:
   a plurality of call application nodes each including
      a serving call session control function capable of receiving requests corresponding to one or more multi-participant services from a message distributor, wherein the message distributor is capable of distributing requests corresponding to multi-participant services to any one of the serving call session control functions in the communications system,
      a multi-participant service application server capable of providing multi-participant services based on the corresponding requests, and
      a multi-participant service routing function capable of receiving the requests from the serving call session control function, determining for each request whether the request comprises routing information, and processing each request based upon the determination.

2. The communications system according to claim 1, wherein the multi -participant service routing function is one of included within the serving call session control function in each of the plurality of call application nodes, included within the multi-participant service application server in each of the plurality of call application nodes, and a stand-alone entity separated from the serving call session control function and the multi-participant service application server in each of the plurality of call application nodes.

3. The communications system according to claim 1, wherein the multi-participant service routing function (i) forwards the request to a local multi-participant service application server within the call application node if either the routing information corresponds to the local multi-participant service application server or routing information is absent from the request and (ii) forwards the multi-participant service request to a non-local multi-participant service application server within another call application node if the routing information corresponds to the non-local multi-participant service application server.

4. The communications system according to claim 3, wherein the request is forwarded by the multi-participant service routing function directly to the non-local multi-participant service application server without routing the request through a non-local serving call session control function corresponding to the non-local multi-participant service application server.

5. The communications system according to claim 1, wherein the request comprises one of a user request to initiate the multi-participant service and a user request to join the multi-participant service.

6. The communications system according to claim 1, wherein each of the plurality of multi-participant service application servers is capable of establishing one or more multi-participant services selected from conference call services and push-to-talk communications services.

7. The communications system according to claim 1, wherein each request comprises a service identifier capable of identifying the corresponding multi-participant service, and wherein the multi-participant service routing function is capable of determining whether the request comprises routing information by determining whether the service identifier for the request comprises routing information.

8. The communications system according to claim 1, wherein the Internet Protocol multimedia subsystem is included within a telecommunications network, the telecommunications network further comprising:
a Session Initiation Protocol network receiving multi-participant service requests from a plurality of users and forwarding the received multi-participant service requests to the message distributor.

9. A method of processing multi-participant service requests within a communications system, comprising:
distributing requests corresponding to multi-participant services to at least one of a plurality of call application nodes each call application node including a multi-participant service application server; a multi-participant service routing function for
determining for each one of said requests whether the request comprises routing information; and
processing the request based upon the determination.

10. The method according to claim 9, wherein each call application node further includes a serving call session control function and includes a multi-participant service routing function that is capable of determining whether the request comprises routing information and processing the request, and wherein the multi-participant service routing function is one of included within the serving call session control function, included within the multi-participant service application server, and a stand-alone entity separated from the serving call session control function and the multi-participant service application server.

11. The method according to claim 9, further comprising:
forwarding the request to a local multi-participant service application server within the call application node if either the routing information corresponds to the local multi-participant service application server or routing information is absent from the request; and
forwarding the request to a non-local multi-participant service application server within another call application node if the routing information corresponds to the non-local multi-participant service application server.

12. The method according to claim 11, wherein forwarding the request to the non-local multi-participant service application server comprises directly forwarding the request to the non-local multi-participant service application server without routing the request through a serving call session control function corresponding to the non-local multi-participant service application server.

13. The method according to claim 9, wherein the request comprises a user request to initiate the multi-participant service or a user request to join the multi-participant service.

14. The method according to claim 9, further comprising:
establishing one or more multi-participant services selected from conference call services and push-to-talk communications services using one of the plurality of multi-participant service application servers.

15. A communications network, comprising:
a plurality of call application nodes each including:
a serving call session control function capable of receiving requests corresponding to one or more multi-participant services,
a multi-participant service application server capable of providing multi-participant services based on the corresponding requests, and
a multi-participant service routing function capable of receiving the requests from the serving call session control function, determining for each request whether a service identifier for the request comprises routing information, and, for each request, (i) forwarding the request to a local multi-participant service application server within the call application node if either the routing information corresponds to the local multi-participant service application server or routing information is absent from the request and (ii) forwarding the multi-participant service request to a non-local multi-participant service application server within another call application node if the routing information corresponds to the non-local multi-participant service application server.

16. The communications network according to claim 15, wherein the multi-participant service routing function is one of included within the serving call session control function in each of the plurality of call application nodes, included within the multi-participant service application server in each of the plurality of call application nodes, and a stand-alone entity separated from the serving call session control function and the multi-participant service application server in each of the plurality of call application nodes.

17. The communications network according to claim 15, further comprising:
a message distributor capable of receiving and distributing multi-participant service requests from a plurality of multi-participant service users to one of the plurality of serving call session control functions independent of routing information, if any, embedded in the service identifiers for the requests.

18. The communications network according to claim 15, wherein, when the non-local multi-participant service application server receives one of the requests, the non-local multi-participant service application server processes the request and sends a response message directly to the local serving call session control function.

19. The communications network according to claim 15, wherein the request is forwarded by the multi-participant service routing function directly to the non-local multi-participant service application server without routing the request through a non-local serving call session control function corresponding to the non-local multi-participant service application server.

20. The communications network according to claim 15, wherein the request comprises one of a user request to initiate the multi-participant service and a user request to join the multi-participant service.

21. The communications network according to claim 15, wherein each of the plurality of multi-participant service application servers is capable of establishing one or more multi-participant services selected from conference call services and push-to-talk communications services.

22. The communications network according to claim 17, further comprising an Internet Protocol multimedia subsystem included within a telecommunications network, the telecommunications network further comprising:

a Session Initiation Protocol network receiving multi-participant service requests from a plurality of users and forwarding the received multi-participant service requests to the message distributor.

* * * * *